(12) United States Patent
Kikuchi et al.

(10) Patent No.: US 12,435,978 B2
(45) Date of Patent: Oct. 7, 2025

(54) SURVEYING INSTRUMENT

(71) Applicant: TOPCON CORPORATION, Tokyo (JP)

(72) Inventors: Masaho Kikuchi, Tokyo (JP); Akinobu Sugiura, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 404 days.

(21) Appl. No.: 18/125,609

(22) Filed: Mar. 23, 2023

(65) Prior Publication Data

US 2023/0314135 A1  Oct. 5, 2023

(30) Foreign Application Priority Data

Mar. 30, 2022  (JP) .................................. 2022-057727

(51) Int. Cl.
*G01C 15/00* (2006.01)
*G01C 5/00* (2006.01)

(52) U.S. Cl.
CPC ............ *G01C 15/006* (2013.01); *G01C 5/00* (2013.01)

(58) Field of Classification Search
CPC ....... G01C 5/00; G01C 15/006; G01C 15/008
USPC ....................................... 33/275 R, 290, 291
See application file for complete search history.

(56) References Cited

U.S. PATENT DOCUMENTS

| | | | | |
|---|---|---|---|---|
| 4,056,311 A | * | 11/1977 | Winthrop | G02C 7/061 351/159.42 |
| 5,291,262 A | | 3/1994 | Dunne | |
| 6,137,568 A | * | 10/2000 | Ohtomo | G01C 15/002 356/249 |
| 7,345,748 B2 | * | 3/2008 | Sugiura | G01C 15/002 356/139.05 |
| 10,690,497 B2 | * | 6/2020 | Nagashima | G01C 15/08 |

(Continued)

FOREIGN PATENT DOCUMENTS

| | | |
|---|---|---|
| CN | 205067877 U | 3/2016 |
| EP | 2 105 705 A1 | 9/2009 |

(Continued)

OTHER PUBLICATIONS

José L. García-Balboa et al. "A Field Procedure for the Assessment of the Centring Uncertainty of Geodetic and Surveying Instruments" sensors, 2018, pp. 1-16, 18, 3187, doi: 10.3390/s18103187.

(Continued)

*Primary Examiner* — George B Bennett
(74) *Attorney, Agent, or Firm* — Studebaker Brackett PLLC

(57) ABSTRACT

A surveying instrument capable of irradiating a spotlight as visible light for centering toward a position below a vertical axis of a surveying instrument main body is configured such that that an irradiation shape of the spotlight is a toric shape. When visible light for centering which passes through a center point of the surveying instrument and is projected on a position right below the surveying instrument is projected in a toric shape having a hole opened at a center like a donut shape, both of an inner circle and an outer circle can be recognized, so that many guides are provided, and it is easier for a worker to align the toric shape with the target point than a point shape, so that the burden of a centering work on the worker is reduced.

8 Claims, 5 Drawing Sheets

(56) References Cited

U.S. PATENT DOCUMENTS

| | | |
|---|---|---|
| 2008/0231830 A1 | 9/2008 | Osada |
| 2018/0003493 A1 | 1/2018 | Bernhard et al. |
| 2020/0166340 A1 | 5/2020 | Hinderling |
| 2022/0091436 A1* | 3/2022 | Wright .................. B41M 3/003 |
| 2023/0175844 A1* | 6/2023 | Shoji ...................... G01C 15/00 356/4.01 |
| 2023/0314131 A1 | 10/2023 | Kikuchi |
| 2023/0349695 A1 | 11/2023 | Kikuchi et al. |

FOREIGN PATENT DOCUMENTS

| | | |
|---|---|---|
| JP | H05-064720 A | 3/1993 |
| JP | H06-213664 A | 8/1994 |
| JP | 2008-232881 A | 10/2008 |
| WO | 2008/124713 A2 | 10/2008 |

OTHER PUBLICATIONS

Evangelia Lambrou et al. "Detecting the Centring Error of Geodetic Instruments Over a Ground Mark Through a Tribrach-Based Optical Plummet" Applied Geomatics, Nov. 15, 2017, pp. 237-245, vol. 9, https://doi.org/10.1007/s12518-017-0197-8.

* cited by examiner

SURVEYING INSTRUMENT

TECHNICAL FIELD

The present invention relates to a surveying instrument that irradiates light toward a position below a vertical axis of a surveying instrument main body for a centering work.

BACKGROUND ART

In a survey work, it is necessary to first install a surveying instrument above a known reference point (measuring mark) by leveling the surveying instrument (leveling work) and matching a center point of the surveying instrument with the reference point in the vertical direction (centering work). In the centering work, a worker moves the surveying instrument to finely adjust it while looking into a centering telescope with which a position below a vertical axis of the surveying instrument main body can be observed (Patent Literature 1). In recent years, a surveying instrument may include a laser centering device that emits visible laser light to a position right below (Patent Literature 2).

CITATION LIST

Patent Literatures

Patent Literature 1: Japanese Published Unexamined Utility Model Application No. H05-64720
Patent Literature 2: Japanese Published Unexamined Patent Application No. H06-213664

SUMMARY OF INVENTION

Technical Problem

However, as in Patent Literature 1, when a centering telescope is used, a worker finely adjusts a position of the surveying instrument while looking into the centering telescope, so that the worker has to keep a slightly bent posture that strains his/her back, so that the burden on the worker is great. As in Patent Literature 2, when laser light is irradiated toward a position right below the surveying instrument, an irradiation shape for irradiating a measuring mark is a point, so that it is also difficult for a worker to read it, and it is difficult to align the laser light with a center of the measuring mark.

The present invention was made in view of this, and an object thereof is to provide a surveying instrument that reduces the burden of a centering work on a worker.

Solution to Problem

In order to solve the problem described above, in an aspect of the present disclosure, a surveying instrument capable of irradiating a spotlight as visible light for centering toward a position below a vertical axis of a surveying instrument main body is configured such that an irradiation shape of the spotlight is a toric shape.

According to this aspect, a spotlight as visible light is irradiated toward a position below the vertical axis of the surveying instrument main body, and a worker can perform a centering work by aligning a center of this spotlight with a measuring mark with respect to which the surveying instrument is disposed. As a characteristic of human work, as compared with alignment of a point or a center of a circle with a target position, positional alignment of the center in a toric shape that has a hole opened at a center like a donut and has an inner circle and an outer circle is better. Further, at a measuring mark to be used as a reference point of a survey, crosshairs or concentric circles are provided, and a spotlight having a toric shape that is larger than a point allows for easier positional alignment because positional alignment can be made by also using such crosshairs and concentric circles on the measuring mark and further using an outer shape of the measuring mark as a guide. By forming the spotlight that serves as a guide into a toric shape of a donut shape, a worker can easily align a center of the measuring mark and the center of the spotlight. The centering work can be easily performed, and the burden on the worker is reduced.

Further, according to an aspect, the surveying instrument includes a distance-measuring unit for instrument height calculation including a light transmitting unit and a light receiving unit, and is configured such that the spotlight is light that the light transmitting unit transmits to a position below the vertical axis of the surveying instrument main body to make a distance measurement. According to this aspect, visible light whose irradiation shape is a toric shape is emitted from the light transmitting unit to a position right below the surveying instrument. A worker can perform a centering work by using this visible light emitted from the light transmitting unit as a spotlight, and after the centering work is completed, the spotlight is distance-measuring light, so that a distance to the reference point can be directly measured, and an instrument height can be calculated.

Further, in an aspect, a configuration is provided such that an outer diameter of the spotlight at a distance of 1 m from a bottom surface of the surveying instrument main body is 5 mm to 30 mm. According to this aspect, the spotlight has a size that does not protrude from the measuring mark and is an appropriate size that a worker can easily align.

Further, in an aspect, the surveying instrument includes a spotlight irradiating unit capable of irradiating a position below the vertical axis of the surveying instrument main body with the spotlight, and is configured such that the spotlight irradiating unit includes a light emitting unit configured to emit visible light, a collimating lens disposed in front of the light emitting unit and has an optical axis aligned with the vertical axis of the surveying instrument main body, and a toric light shaping unit disposed on the optical axis of the collimating lens and configured to convert an irradiation shape of incident light into a toric shape and emit the light, and the irradiation shape of the spotlight is configured to be a donut shape having a hole opened at a center. According to this aspect, a spotlight in a donut shape can be irradiated toward a position below along the vertical axis of the surveying instrument main body, and a worker can easily perform a centering work.

Advantageous Effects of Invention

As is clear from the description above, a surveying instrument that reduces the burden of a centering work on a worker is provided.

BRIEF DESCRIPTION OF DRAWINGS

FIG. 4A illustrates a toric light shaping unit as a lens, and FIG. 4B illustrates a toric light shaping unit as a black member including a light transparent portion.

DESCRIPTION OF EMBODIMENTS

Hereinafter, detailed embodiments of the present invention will be described with reference to the drawings. The embodiments do not limit the invention but are illustrations, and all features described in the embodiments and combinations of the features are not necessarily essential for the present invention. In the following description of embodiments and modifications, the same configurations are provided with the same reference signs, and overlapping description will be omitted as appropriate.

(Surveying Instrument)

Figure 1:
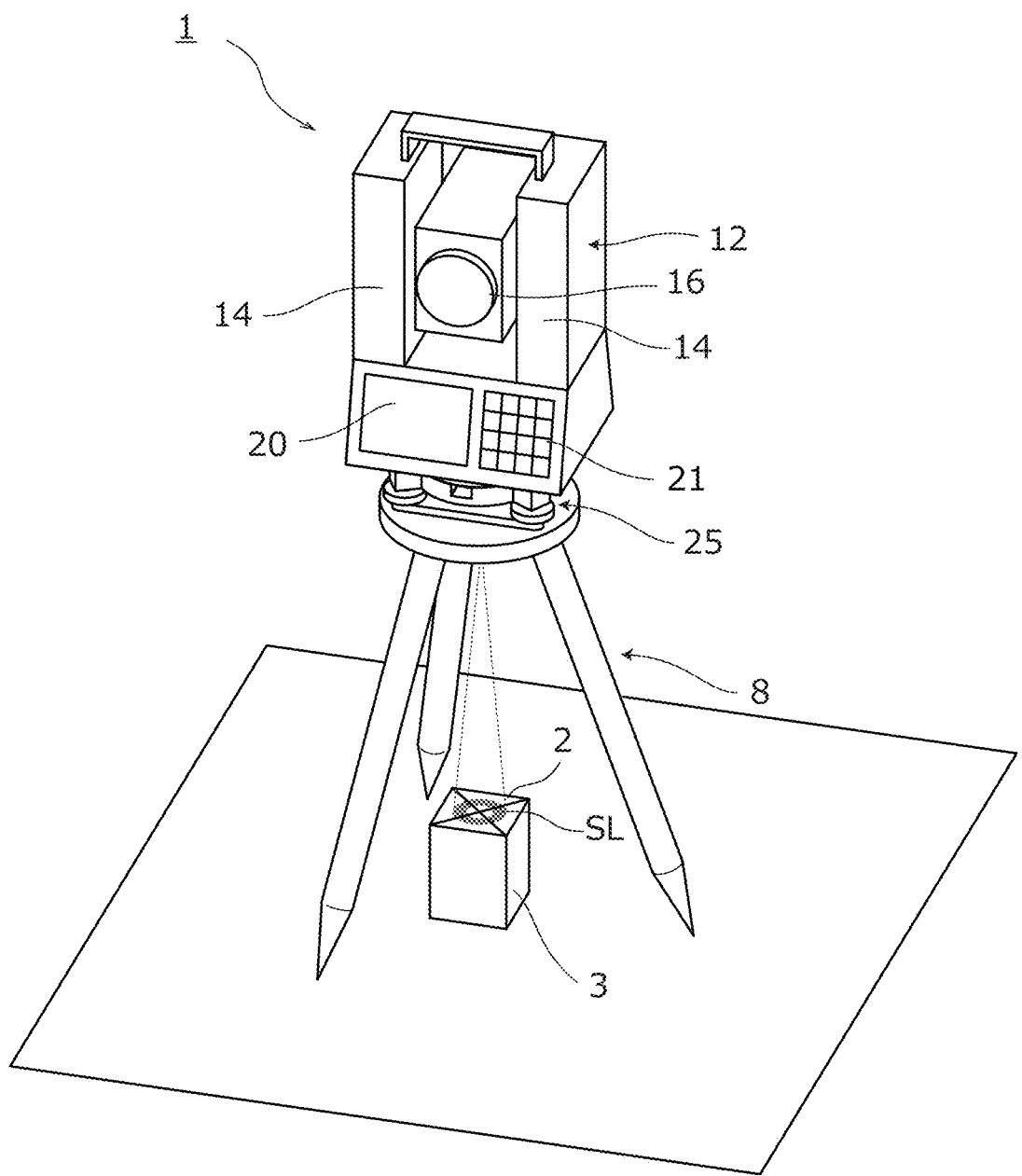
FIG. 1 is a perspective view of a surveying instrument and a measuring mark according to a first embodiment.
Figure 2:
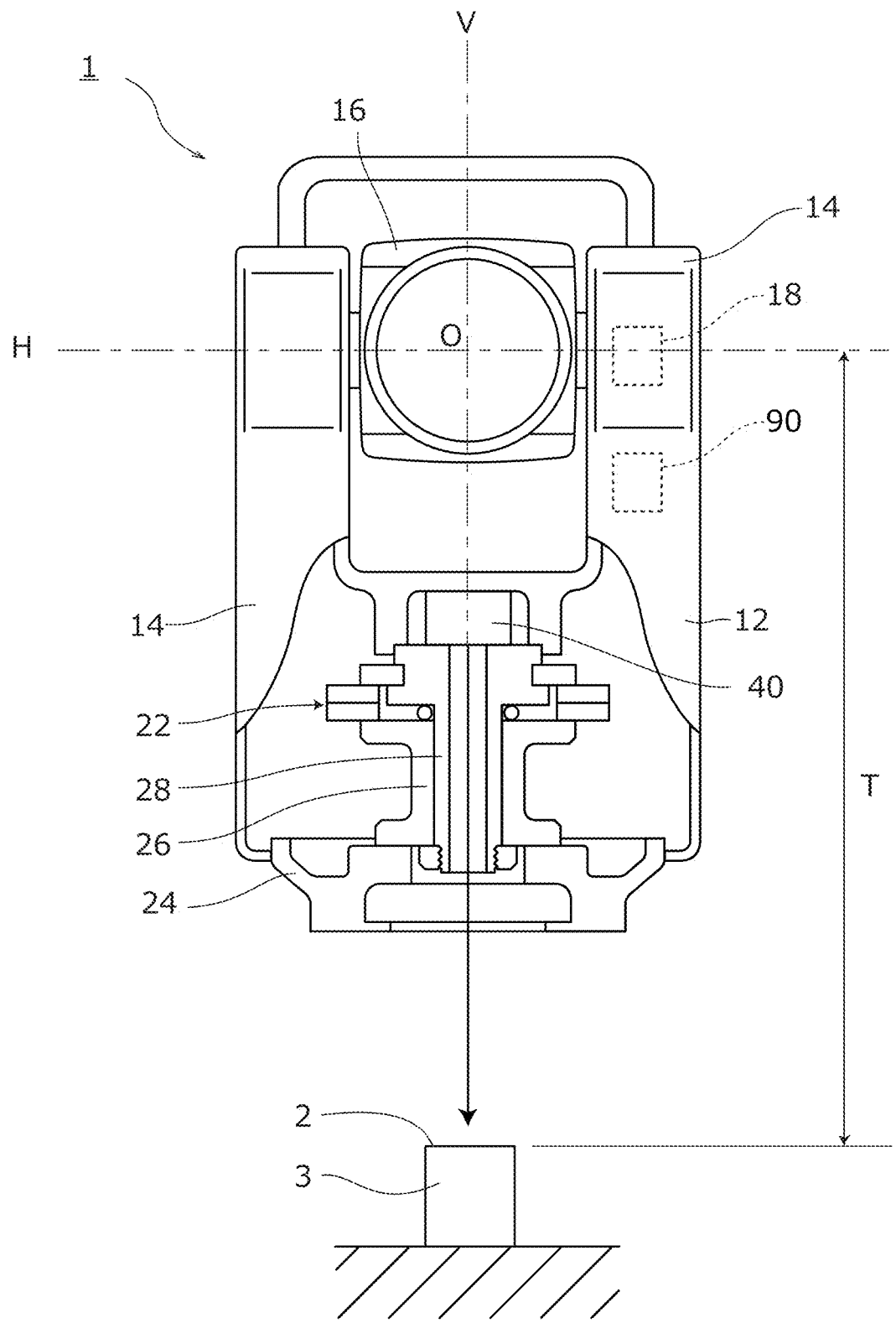
FIG. 2 is an explanatory view illustrating a schematic configuration of the same surveying instrument and measuring mark, and is a partially cut-away view.

FIG. 1 is a perspective view of a surveying instrument 1 and a measuring mark 2 according to a first embodiment. FIG. 2 is an explanatory view illustrating a schematic configuration of the surveying instrument 1 and the measuring mark 2. FIG. 2 is a partially cut-away view.

The surveying instrument 1 is a total station having distance-measuring and angle-measuring functions. The measuring mark 2 is a survey reference point, and is provided on the point of a stone marker 3.

The surveying instrument 1 includes a main body casing 12 as a housing of the surveying instrument. The main body casing 12 corresponds to the surveying instrument main body in Claims of the present application. The main body casing 12 includes two supporting posts 14, and between the two supporting posts 14, a collimating telescope 16 is axially supported turnably around a horizontal axis H.

On a lower portion of the main body casing 12, a display 20 and an operation key group 21 are disposed. The display 20 displays necessary information on a screen. The operation key group 21 is input means for inputting necessary setting conditions and commands.

Further, the main body casing 12 is disposed on a leveling base 25, and the leveling base 25 is fixed to a tripod 8 in a state where the leveling base 25 is placed on the tripod 8.

On a fixation portion 24 at a lower portion of the main body casing 12, a shaft cylinder 26 is disposed. Inside the shaft cylinder 26, a vertical shaft 28 provided in the main body casing 12 is inserted, and axially supported turnably on the fixation portion 24 via a ball bearing. Accordingly, the main body casing 12 is turnable around the vertical shaft 28 with respect to the fixation portion 24. The leveling base 25 has an adjust screw for finely adjusting a tilt, and the fixation portion 24 is fixed onto the adjust screw. By turning of the adjust screw, the surveying instrument 1 is adjusted to be horizontal.

At an upper end portion of the shaft cylinder 26 and an upper end portion of the vertical shaft 28, flange portions facing each other are formed, and here, a rotary encoder 22 is provided. The rotary encoder 22 is a horizontal angle sensor, and detects a rotation amount of the main body casing 12.

The vertical shaft 28 is formed into a hollow cylindrical shape, and an extension of a centerline V of the vertical shaft 28 intersects the horizontal axis H orthogonally. The orthogonal intersection point between the horizontal axis H and the centerline V is set as a center point O of the surveying instrument 1. Since the main body casing 12 axially supporting the collimating telescope 16 turns around the centerline V, by an angle sensor 18 provided on the horizontal axis H and the rotary encoder 22 described above, a rotation amount of the collimating telescope 16 around the horizontal axis H and a rotation amount around the centerline V are detected.

Above the vertical shaft 28, a spotlight irradiating unit 40 that irradiates a spotlight SL is disposed. The spotlight SL is visible light for centering, and the spotlight irradiating unit 40 irradiates the spotlight SL toward a position below along the vertical axis of the surveying instrument 1 so that a light emitting direction matches the centerline V.

(Spotlight Irradiating Unit)

Figure 3:
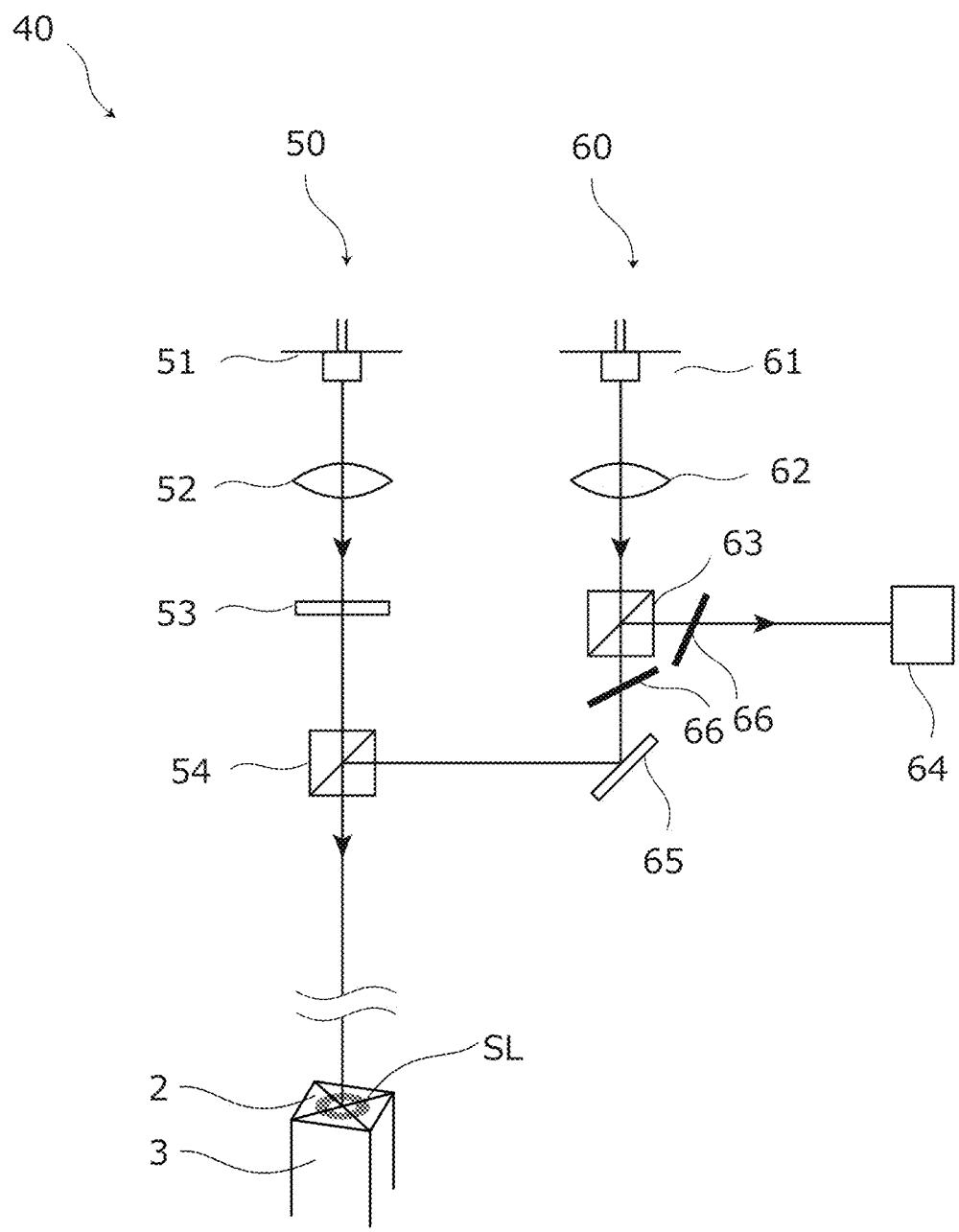
FIG. 3 illustrates an optical configuration of a spotlight irradiating unit 40.

FIG. 3 is a configuration diagram of an optical system of the spotlight irradiating unit 40. In the present embodiment, the spotlight irradiating unit 40 includes a light irradiating unit 50 that irradiates the spotlight SL as visible light for centering downward along the centerline V of the vertical shaft 28 toward a position below the vertical axis of the surveying instrument main body, and further includes the distance-measuring unit 60 that measures a distance to an object below a vertical axis of the surveying instrument 1. A distance-measuring unit 60 is provided to calculate an instrument height T that is a height from the center point O of the surveying instrument 1 to the measuring mark 2.

The spotlight irradiating unit 40 includes a light emitting unit 51, a first collimating lens 52, a toric light shaping unit 53, a dichroic prism 54, a light transmitting unit 61, a second collimating lens 62, a beam splitter 63, a light receiving unit 64, a reflecting mirror 65, and a shutter 66. The light irradiating unit 50 consists mainly of the light emitting unit 51, the first collimating lens 52, and the toric light shaping unit 53. The distance-measuring unit 60 consists mainly of the light transmitting unit 61, the second collimating lens 62, the beam splitter 63, the light receiving unit 64, and the shutter 66.

The light emitting unit 51 is a light emitting photodiode (LED), and emits visible light. The first collimating lens 52 is disposed in front of the light emitting unit 51, and light emitted from the light emitting unit 51 is collimated into parallel light by the first collimating lens 52. An optical axis of the first collimating lens 52 matches the centerline V, and is configured so that the optical axis line passes through the center point O of the surveying instrument 1.

Figure 4A:
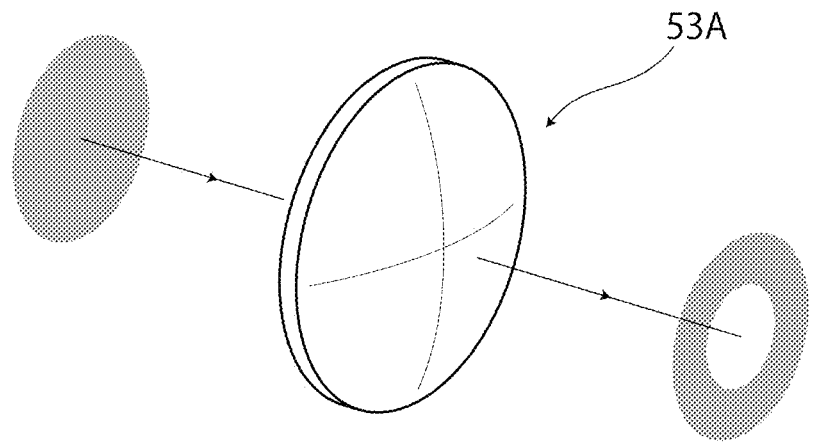
FIGS. 4A and 4B are explanatory views illustrating examples of a toric light shaping unit.

The toric light shaping unit 53 converts incident light into light whose irradiation shape is a toric shape and emits the light. For example, the toric light shaping unit 53A illustrated in FIG. 4A is a lens that has a shape set by calculating a wavelength of the light, and converts a circular irradiation shape of incident light made incident from an entrance surface into a toric irradiation shape and emits the light. The toric light shaping unit 53A may consist of a plurality of lenses as well as consisting of only one lens.

Figure 4B:
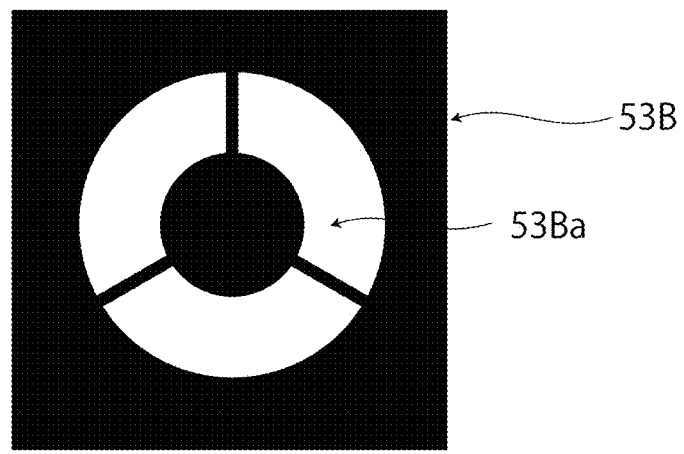

Further, the toric light shaping unit 53B illustrated in FIG. 4B is a thin plate whose surface is made of a light absorbing material, and has a light transparent portion 53Ba having a property of being transparent to light, and incident light is transmitted only through the light transparent portion 53Ba, and the remaining light is absorbed, and an irradiation shape of the light follows the shape of the light transparent portion 53Ba. The light transparent portion 53Ba is formed into a substantially toric shape, and light that passed through the light transparent portion 53Ba is emitted as toric light.

The toric light shaping unit 53B is formed by, for example, applying black vapor deposition or a black paint to a transparent resin plate made of acryl resin or the like with masking provided only at its light transparent portion, by injection molding by die-cutting only the light transparent portion 53Ba in a black resin plate, or by punching-out the light transparent portion 53Ba in a metal thin plate and applying a light absorbing paint to the surface of the plate.

Light whose irradiation shape has been converted into a toric shape by the toric light shaping unit 53 and emitted passes through the dichroic prism 54, travels through the vertical shaft 28, passes through a through hole formed in the leveling base 25 and the tripod 8, and is irradiated as a spotlight SL toward a position below the vertical axis of the surveying instrument 1. The spotlight SL is projected on an object below the surveying instrument 1 and visually recognized as toric light.

An optical axis of the spotlight SL matches the centerline V of the vertical shaft 28, and the spotlight SL is irradiated toward a position below the vertical axis of the surveying instrument main body, so that the spotlight SL as visible light for centering which passes through the center point O serves as a guide at the time of a centering work.

The light transmitting unit 61 consists of a laser diode (LD), and the light receiving unit 64 consists of an Avalanche photodiode (APD). The beam splitter 63 consists of a dichroic prism.

Laser light sent out from the light transmitting unit 61 passes through the second collimating lens 62, and is split into distance-measuring light and reference light by the beam splitter 63, and alternatively emitted by the shutter 66. The reference light travels toward the light receiving unit 64 and is received by the light receiving unit 64. The distance-measuring light is emitted toward the reflecting mirror 65 and travels toward the dichroic prism 54, and is reflected to the same axis as the light path of the spotlight SL. After that, the distance-measuring light passes through the same light path as the spotlight SL, and is emitted from the surveying instrument 1 toward a position below along the vertical axis of the surveying instrument main body, and reflected by a distance-measuring object below the surveying instrument 1 and returns following the same course, and is then reflected by the beam splitter 63 and travels toward the light receiving unit 64 and is received by the light receiving unit 64. A measurement result is output to an arithmetic unit 90 such as a microcomputer including a memory and a CPU, and a distance-measurement value is calculated from a phase difference between the reference light and the distance-measuring light.

When a worker installs the surveying instrument 1 by setting the measuring mark 2 as a reference point, the worker places the surveying instrument 1 substantially vertically above the measuring mark 2 by using a tripod 8, and performs a leveling work to level the surveying instrument 1 with an adjust screw of the leveling base 25. Then, a spotlight SL is irradiated, and a positional adjustment is made by sliding the surveying instrument 1 so that the center of the measuring mark 2 matches the center of the spotlight SL while maintaining a leveled state. Due to this centering work, the surveying instrument may tilt from the horizontal state, and by repeating the leveling work and the centering work, the surveying instrument 1 is disposed in a horizontal state vertically above the measuring mark 2. When a distance measurement is made by the distance-measuring unit 60, distance-measuring light transmitted from the light transmitting unit 61 measures a distance to the measuring mark 2. A line vertically upward from the measuring mark 2 and the centerline V match each other, and a disposition relationship between the center point O of the surveying instrument 1 and optical members of the distance-measuring unit 60 (particularly a light transmission point of the light transmitting unit 61) is grasped, so that an instrument height T is calculated from the distance-measurement result.

Both of the leveling work and the centering work can be performed by a worker in a posture facing the surveying instrument 1, and calculation of the instrument height T is also automatically performed, so that the burden of the centering work and the burden of installation of the surveying instrument 1 on the worker are reduced.

In the present embodiment, the spotlight irradiating unit 40 has both of a spotlight irradiating function and a distance-measuring function for measuring an instrument height. The spotlight irradiating unit may be configured only with the spotlight irradiating function, and the distance-measuring function for measuring an instrument height may be configured separately. As the configuration for calculation of an instrument height, a conventional configuration may be used such as a configuration in which measuring light of the collimating telescope 16 provided in the main body casing 12 is guided to a position below the vertical axis of the surveying instrument 1 and a measurement is made by using the distance-measuring function of the surveying instrument 1 or a configuration in which an instrument height is manually measured with a measuring tape or scale. When a worker manually makes a measurement, the worker inputs a measurement value from an operation key group 21.

An irradiation shape of the spotlight SL is a planar donut shape having a hole opened at a center, and includes an inner circle that is an outer shape of the center hole and an inner shape of the irradiation light, and an outer circle that is an outer shape of the irradiation light. It is preferable that, as a width of the light, the light has an appropriately thick band shape since the light is recognized as a concentric circle shape including an inner circle and an outer circle, and is more easily aligned with a target point. In particular, on a measuring mark to be used as a reference point of a survey, an auxiliary line such as crosshairs or concentric circles are provided, so that the spotlight SL having the toric shape is a shape that allows earlier alignment.

As a width of the toric shape, a band shape is more preferable than a string shape, so that the outer diameter is preferably 1.1 times or more as large as the inner diameter, and more preferably 1.2 to 4 times since the inner diameter and the outer diameter are both recognized and the spotlight can be more easily aligned with a guide, and a donut shape whose outer diameter is 1.5 to 2.5 times as large as the inner diameter is further preferable since it is easily recognized as being of concentric circles.

Further, if the outer shape of the spotlight SL also has an appropriate large size, not only the center of the measuring mark 2 but also the outer shape of the measuring mark 2 also serve as a guide, and this is preferable. Therefore, it is preferable that a size of the spotlight SL when irradiated onto the measuring mark 2 does not protrude from the measuring mark 2, and is equal to or larger than a laser centering point. Therefore, an irradiation shape of the spotlight SL onto a virtual plane at a distance of 1 m from a bottom surface of the surveying instrument 1 preferably has an outer diameter of approximately 2 mm to 30 mm, and more preferably, 5 mm to 20 mm. A configuration is also possible in which an additional optical member for changing the irradiation shape of the spotlight SL in size is disposed so that the size and width of the spotlight SL are variable.

In the present embodiment, the spotlight irradiating unit 40 is disposed above the vertical shaft 28, and its optical members are all disposed here. Without limitation to this, some of optical members of the spotlight irradiating unit 40 may be disposed on the vertical shaft 28, the fixation portion 24, and the like, such as a configuration in which the light emitting unit 51 is attached to the main body casing 12, and the collimating lens is disposed inside the hollow vertical shaft 28.

Second Embodiment

Figure 5:
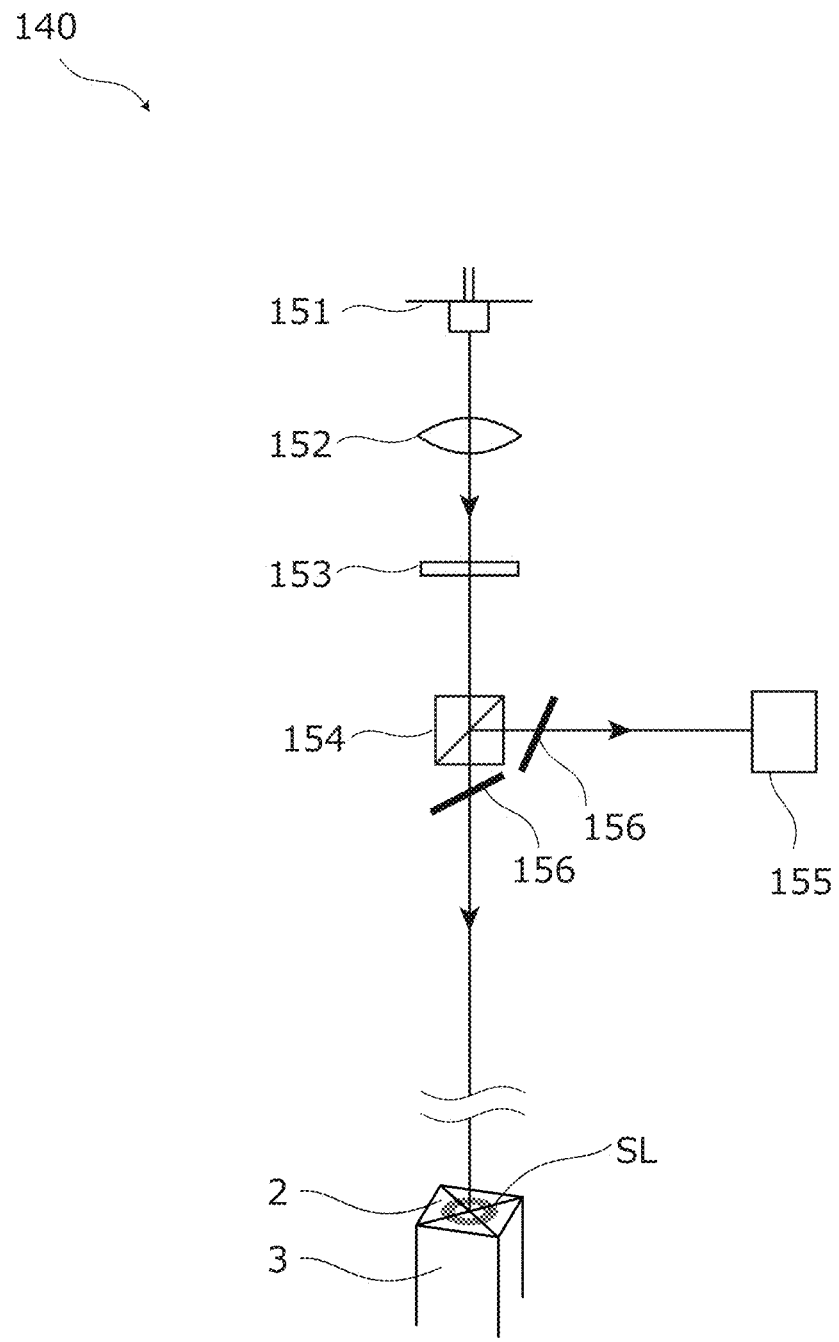
FIG. 5 illustrates an optical configuration of a spotlight irradiating unit according to a second embodiment.

FIG. 5 is a configuration diagram of an optical system of a spotlight irradiating unit 140 equipped in a surveying instrument 101 according to a second embodiment. The surveying instrument 101 is configured equally with the surveying instrument 1 except for the configuration of the optical system of the spotlight irradiating unit 140. Therefore, its schematic configuration diagram is the same as FIGS. 1 and 2, and is hence omitted.

The spotlight irradiating unit 140 includes a light emitting unit 151, a collimating lens 152, a toric light shaping unit 153, a beam splitter 154, a light receiving unit 155, and a shutter 156.

In the present embodiment, a light irradiating unit that irradiates a spotlight SL and a distance-measuring unit for instrument height calculation are configured integrally. Therefore, visible light to be emitted from the light emitting unit 151 is a spotlight SL for centering, and is distance-measuring light. In the present embodiment, for the light emitting unit 151, a red laser diode (LD) is used.

An optical axis of the collimating lens 152 matches the centerline V, and is configured so that the optical axis line passes through a center point O of the surveying instrument 101. The toric light shaping unit 153 and the beam splitter 154 are disposed on the optical axis of the collimating lens 152. Optical characteristics of the toric light shaping unit 153, the beam splitter 154, the light receiving unit 155, and the shutter 156 are equivalent to those of the toric light shaping unit 53, the beam splitter 63, the light receiving unit 64, and the shutter 66, respectively.

Light emitted from the light emitting unit 151 is collimated into parallel light by the collimating lens 152, and emitted as light whose irradiation shape is a toric shape by the toric light shaping unit 153. The light is split into distance-measuring light and reference light by the beam splitter 154, and alternatively emitted by the shutter 156. The reference light travels toward the light receiving unit 155 and is received by the light receiving unit 155. The distance-measuring light is emitted as it is as a spotlight SL toward a position below the vertical axis of the surveying instrument 101, and visually recognized as toric light. A portion of the distance-measuring light is reflected by a distance-measuring object irradiated with the spotlight SL and returns to the surveying instrument 1, and is then reflected by the beam splitter 154 and travels toward the light receiving unit 155, and is received by the light receiving unit 155. A measurement result is output to the arithmetic unit 90, and a distance-measurement value is calculated from a phase difference between the reference light and the distance-measuring light. Here, the measurement result is calculated as an average value of distances to a toric-shaped plane of irradiation onto the measuring mark 2. Accordingly, an instrument height T of the surveying instrument 101 is obtained.

The spotlight SL is visible light for centering, and serves as a guide at the time of a centering work, and a distance measurement for calculating the instrument height T is also made at the same time. Along with the centering work to the measuring mark 2, an instrument height T is automatically calculated. A configuration is also possible in which, at the time of the centering work, the shutter 156 is set to guide the light not to the reference light path but only to the distance-measuring light path, and after the centering work, this setting is canceled and a distance measurement is performed. A configuration is also possible in which the start and completion of the centering work are input from the operation key group 21 and the shutter 156 is changed in disposition. The toric light shaping unit 153 may be disposed between the beam splitter 154 and the measuring mark 2 so that the toric light shaping unit 153 is disposed in the distance-measuring light path.

Preferred embodiments of the present invention have been described above, and the embodiments described above are just examples of the present invention, and can be combined based on the knowledge of a person skilled in the art, and such a combined embodiment is also included in the scope of the present invention.

REFERENCE SIGNS LIST 1, 101: Surveying instrument
12: Main body casing (surveying instrument main body)
40: Spotlight irradiating unit
50: Light irradiating unit
51, 151: Light emitting unit
52, 152: Collimating lens
53, 153: Toric light shaping unit
60: Distance-measuring unit
61: Light transmitting unit (light emitting unit 151)
64, 155: Light receiving unit
SL: Spotlight
T: Instrument height

The invention claimed is:

1. A surveying instrument capable of irradiating a spotlight as visible light for centering toward a position below a vertical axis of a surveying instrument main body, wherein
an irradiation shape of the spotlight is a toric shape.

2. The surveying instrument according to claim 1, comprising:
a distance-measuring unit for instrument height calculation including a light transmitting unit and a light receiving unit, wherein
the spotlight is light that the light transmitting unit transmits to a position below the vertical axis of the surveying instrument main body to make a distance measurement.

3. The surveying instrument according to claim 1, wherein
an outer diameter of the spotlight at a distance of 1 m from a bottom surface of the surveying instrument main body is 5 mm to 30 mm.

4. The surveying instrument according to claim 2, wherein
an outer diameter of the spotlight at a distance of 1 m from a bottom surface of the surveying instrument main body is 5 mm to 30 mm.

5. The surveying instrument according to claim 1, comprising a spotlight irradiating unit capable of irradiating a position below the vertical axis of the surveying instrument main body with the spotlight, wherein
the spotlight irradiating unit comprises:
a light emitting unit configured to emit visible light;
a collimating lens disposed in front of the light emitting unit and has an optical axis aligned with the vertical axis of the surveying instrument main body; and a toric light shaping unit disposed on the optical axis of the collimating lens and configured to convert an irradiation shape of incident light into a toric shape and emit the light, and the irradiation shape of the spotlight is a donut shape having a hole opened at a center.

6. The surveying instrument according to claim 2, comprising a spotlight irradiating unit capable of irradiating a position below the vertical axis of the surveying instrument main body with the spotlight, wherein the spotlight irradiating unit comprises:

a light emitting unit configured to emit visible light;

a collimating lens disposed in front of the light emitting unit and has an optical axis aligned with the vertical axis of the surveying instrument main body; and a toric light shaping unit disposed on the optical axis of the collimating lens and configured to convert an irradiation shape of incident light into a toric shape and emit the light, and the irradiation shape of the spotlight is a donut shape having a hole opened at a center.

7. The surveying instrument according to claim 3, comprising a spotlight irradiating unit capable of irradiating a position below the vertical axis of the surveying instrument main body with the spotlight, wherein the spotlight irradiating unit comprises:

a light emitting unit configured to emit visible light;

a collimating lens disposed in front of the light emitting unit and has an optical axis aligned with the vertical axis of the surveying instrument main body; and a toric light shaping unit disposed on the optical axis of the collimating lens and configured to convert an irradiation shape of incident light into a toric shape and emit the light, and the irradiation shape of the spotlight is a donut shape having a hole opened at a center.

8. The surveying instrument according to claim 4, comprising a spotlight irradiating unit capable of irradiating a position below the vertical axis of the surveying instrument main body with the spotlight, wherein the spotlight irradiating unit comprises:

a light emitting unit configured to emit visible light;

a collimating lens disposed in front of the light emitting unit and has an optical axis aligned with the vertical axis of the surveying instrument main body; and a toric light shaping unit disposed on the optical axis of the collimating lens and configured to convert an irradiation shape of incident light into a toric shape and emit the light, and the irradiation shape of the spotlight is a donut shape having a hole opened at a center.

* * * * *